United States Patent Office 2,829,944
Patented Apr. 8, 1958

2,829,944

METHOD OF EXTRUDING AN AQUEOUS PARTICULATE DISPERSION OF FINELY DIVIDED CELLULOSE

Ray Clyde Houtz, Barrington, Ill., and James Herbert Werntz, Wilmington, Del., assignors to E. I. du Pont de Nemours and Company, Wilmington, Del., a corporation of Delaware No Drawing. Application November 14, 1955
Serial No. 546,788

14 Claims. (Cl. 18—54)

This invention relates to shaped articles of cellulose such as films, filaments and the like and, more particularly, to a process of preparing such articles.

This application is a continuation-in-part of applicants' copending application, Serial No. 322,161, filed November 22, 1952.

The conversion of cellulose into tough, thin films and fine filaments has involved, heretofore, the preparation of solutions of the polymer, or of derivatives thereof, and the subsequent separate step of forming such solutions into the desired shapes. As carried out heretofore, such procedures have been limited by the fact that excessively high viscosity has prevented or made impractical the preparation and handling of solutions that are both high in polymer content and high in the molecular weight of the contained polymer.

Attempts to lower the viscosity of cellulose solutions and speed the dissolving of the cellulose through the use of heat have heretofore caused material polymer degradation. Nevertheless, for the lack of a better method, one of these processes, the viscose process, has achieved great commercial success even though it involves chemical modification and degradation of the cellulose, as well as the dissipation of auxiliary chemicals. Consequently, it has been highly desirable to discover some practical method for forming films, filaments, and the like, that is not complicated by chemical modification, does not involve sacrifices in the properties of fabricated articles due to lowering substantially the degree of polymerization of the cellulose, or does not involve the consumption of other chemicals and the disposal of waste products thereof.

One method of forming shaped objects of cellulose of good quality which does not have the aforementioned disadvantages involves the formation of cellulose compositions, nonpourable at 25° C., comprising cellulose uniformly dispersed in a concentrated aqueous calcium thiocyanate solution, and then shaping the cellulose composition into a film, filament, or the like at elevated temperature under pressure, as described in detail in U. S. Patent application Serial No. 283,356, filed April 21, 1952, now Patent No. 2,737,459, in the names of M. F. Bechtold and J. H. Werntz. However, this process which is superior to the previously known methods for preparing cellulose fibers and films, requires the premixing or compounding of the cellulose with large amounts of calcium thiocyanate.

An object of the present invention is to provide a new and different process for forming cellulose into films, filaments, and other shaped articles. A further object is to provide such a process which avoids the above-mentioned disadvantages of heretofore known processes of preparing shaped articles of cellulose. Other objects will be apparent from the description of the invention given hereinafter.

The above objects are accomplished according to the present invention by extruding through a die to form a shaped article such as a film or filament, an aqueous particulate dispersion of finely-divided cellulose-containing natural polymer having an average particle size of less than 300 microns in diameter, the dispersion including, as an essential component, a water-soluble, polymeric film-forming material, contacting the shaped article with a salt solution capable of dissolving the natural polymer until the finely-divided natural polymer is coalesced, then removing the article from the salt solution before it loses its shape, and, finally, washing the article free of salt. Preferably, the article is immersed in a coagulating bath after contacting the salt solution and prior to the washing step as this improves the wet strength of the article before it is washed with water. The natural polymer may be a mixture of cellulose with other natural polymers, but should consist principally of cellulose.

The term "particulate dispersion" is used herein in the normal and accepted meaning of the term when referring to polymer dispersions. That is, particulate polymer dispersions are suspensions of polymer particles in a medium that is not a solvent for the polymer at the temperature involved. Thus, particulate dispersions of polymer particles are fundamentally different from molecular dispersions of polymer particles, which latter dispersions are solutions.

The particulate cellulose dispersions used in the process of this invention can be prepared by uniformly mixing 1 to 7 parts, by weight, of finely-divided cellulose, including water-insoluble low-substituted cellulose derivatives, having an average particle size of less than 300 microns in diameter, with 19 to 13 parts of water containing 5% to 20%, by weight of the cellulose, of a water-soluble, polymeric film-forming material dissolved therein. Preferably, the dispersions contain 1 to 2.5 parts of cellulose particles, 10% to 15%, by weight of the cellulose, of the polymeric film-forming material, and 9 to 7.5 parts of water. The mixing is conveniently carried out in conventional mixing equipment as, for example, a vessel equipped with a mechanical stirrer, a gear pump, a ball mill, a Banbury-type mixer, or a screw extruder at a temperature between about 30° C. and the freezing point of the dispersion.

The particulate dispersion is formed into the desired shaped article, e. g., a film or filament, by extruding the dispersion by mechanical means or by the pressure of an inert gas through a die or spinneret of desired shape and size. The shaped article can be contacted with the solvent salt solution by immersing it immediately in a solvent salt bath or it can be drawn through air for a short distance under slight tension before contacting with the salt solution. It is essential that the solvent salt solution be maintained at least at a temperature at which the solution is a solvent for the particular cellulose in question but, preferably, it is maintained below the temperature at which bubbles form in the shaped article to any appreciable extent due to the boiling of the water in the cellulose dispersion. Temperatures of 90° C. to 150° C. are operable in general but it is preferred to keep the salt solution at about 105° C. to 110° C. Temperatures below 90° C. are not usually desirable except in the case of some cellulose derivatives relatively easily coalesced, because coalescence takes place unnecessarily slowly. Above 120° C. there is a tendency toward excessive bubble formation. The shaped article can be contacted with the solvent salt solution as an unsupported filament or film or, if desired, the article can be supported on a plate, belt, drum, or the like while it is being coalesced and washed.

The effect of the solvent salt solution on the shaped article is to coalesce the cellulose particles and convert the particulate dispersion to a gel. If left in contact with the salt solution indefinitely, the shaped article would lose its shape, but it can be removed from the salt solution, and is removed in the practice of this invention, after the cellulose particles are substantially coalesced and yet prior to losing its shape, at a point where it has sufficient strength to be washed. Since the shaped article is weak upon removing from the salt solution, it is preferred to immerse it in a coagulating bath before washing. This alternate step improves the wet strength of the article. The gel article need be immersed in the coagulating bath for only a relatively short time, the optimum time depending on the thickness of the film, filament, or the like, before washing out the neutral salt with water. Times ranging from one minute or even less to an hour or more are satisfactory.

As is evident from the foregoing description, the process of this invention involves as essential steps (1) forming a particulate dispersion of finely divided cellulose in an aqueous solution of a polymeric film-forming material, (2) shaping the dispersion into the desired article, e. g., a film or fiber, (3) coalescing the cellulose particles in the shaped dispersion by means of a solvent salt solution and, finally, (4) washing the salts from the shaped article, followed by drying. However, certain additional steps can be included in some cases if desired.

In some instances it may be desirable to contact the shaped dispersion with a liquid bath which gels or sets the polymeric film-forming material in the dispersion. This treatment immobilizes the dispersed cellulose particles by converting the polymeric film-forming material to an insoluble one which acts as a temporary support for the dispersed cellulose particles until the particles are coalesced into a continuous gel, filament or film. This step serves to improve the strength of the shaped dispersion and facilitates its mechanical handling during the coalescing step.

Suitable setting baths for the above purpose include aqueous solutions of electrolytes or of non-electrolytes used in low concentrations, e. g., 0.5% to 40% by weight of the aqueous solution. For example, when anionic polymeric film-forming materials are employed in the dispersion, e. g., sodium alginate, aqueous solutions of polyvalent metal salts, e. g., 5% aqueous calcium thiocyanate, zinc chloride or aluminum sulfate, and aqueous solutions of strong acids, e. g., sulfuric and sulfamic acids, are particularly useful setting baths. When cationic polymeric film-forming materials are employed in the cellulose dispersions, aqueous solutions of soluble sulfates and polysulfonic acids and their salts are especially useful setting baths. In some cases the setting bath can be of the same composition as the coagulating bath used to improve the strength of the gel article after coalescence in the solvent salt bath.

In still other cases it is advantageous to evaporate part of the water from the shaped dispersion prior to contacting it with the solvent salt coalescing bath in order to increase the strength of the shaped dispersion.

Another optional step which is beneficial in some cases, is to pass the gel article after removal from the solvent salt solution but prior to immersion in the coagulating bath or washing, through heated calendar rolls to complete the coalescence of the cellulose particles. Also, in the formation of filaments the gel filament after removal from the solvent salt solution can be drawn or stretched prior to immersion in the coagulating bath or washing to improve its physical properties.

After the gel article has been immersed in the coagulating bath for a length of time such that it does not weaken appreciably when transferred to water, determined by separate experiment for each filament diameter, or film thickness, or similar cross-sectional measurement, it is next washed in water until substantially free of salts or other material picked up from the solvent salt solution and/or coagulating baths. Three or four changes of water are usually sufficient to obtain washings free of neutral salts. The washed article is then dried at ordinary or moderately elevated temperatures, e. g., at temperatures of 25° C. to 50° C. and at 40% to 90% relative humidity, when unsoftened. It is convenient to remove excess liquid from gel films by pressing the film on a polished plate with a squeegee. The shrinkage of filaments or films on drying can be controlled by drying them under tension. The gel filament or films can be drawn at ordinary temperatures and then dried under tension to give higher tenacity products.

The following examples in which proportions are expressed in parts by weight and all processing steps are conducted at room temperatures (20° C. to 30° C.) unless otherwise stated, illustrate specific embodiments of the invention.

*Example I*

A dispersion of a commercial pulverized, purified wood pulp is prepared by mixing in a ball mill 11.1 parts of finely-divided chemically purified wood cellulose (97% passing through a 100-mesh screen) with a solution of 1.1 parts of sodium alginate, a water-soluble, polymeric film-forming material, in 87.1 parts of water. A monofil is spun by forcing the viscous dispersion under nitrogen pressure through a glass spinneret with a single orifice of about 1 mm. diameter. The resulting monofil is drawn under slight tension a short distance (about 2 inches) through air and then through a solvent salt solution consisting of a 57% aqueous calcium thiocyanate solution maintained at 130° C. to 135° C. A transparent, coherent, hollow filament is formed. This tough, wet monofil is soaked several minutes in a 25% aqueous sodium chloride coagulating bath, washed with water to remove salts, and air-dried.

*Example II*

A film is formed by spreading a 10 mil coating of the particulate cellulose dispersion of Example I on a glass plate, immersing the supported coating a short time (about 3 minutes) in a 25% aqueous sodium chloride setting bath and then heating the supported coating a few minutes (about 3 minutes) in 57% aqueous calcium thiocyanate solvent salt solution heated at 130° C.–135° C. to coalesce the coating to a clear film. The clear coherent film on the glass plate is then immersed in a 25% aqueous sodium chloride coagulating bath for 6 minutes. The gel film is then stripped from the glass support and washed free of salts. The air-dried film is tough and translucent.

*Example III*

A particulate cellulose dispersion is prepared by mixing until uniform 12 parts of a partially acetylated cellulose containing 5% acetyl, with a solution of 1.8 parts (15% by weight of the cellulose) of sodium alginate and 86.2 parts of water. The partially acetylated cellulose is prepared as follows. To 63 parts of glacial acetic acid and 2 parts of acetic anhydride is added 16.6 parts of wood pulp of the type used commercially for the manufacture of cellulose acetate and having a D. P. (degree of polymerization) of 1400 and containing 96% alphacellulose, and the mixture stirred continuously. After 8 minutes, 20 parts of glacial acetic acid is stirred in and, after 38 minutes, a solution of 0.25 part of sulfuric acid in 12 parts of glacial acetic acid is added. Stirring is continued for an additional 30 minutes when 6 parts of acetic anhydride is added and the stirring then continued for an additional 45 minutes. The reaction mixture is washed free of acid with water, centrifuged, and then dried and ground to pass a 200-mesh screen. There is thus obtained a partially acetylated cellulose having a D. P. of 420.

The particulate cellulose dispersion prepared as above is spread in a uniform layer 3 to 4 mils in thickness on a glass plate and the coating is allowed to air-dry until about one-fourth of the water is evaporated. The coated plate is then immersed in a solvent salt bath consisting of a solution of 70% lithium bromide in methanol maintained at a temperature of 115° C., for about 6 minutes which is a sufficient period of time to form a clear, rubbery gel film but not long enough to cause the film to lose its shape. The supported gel film is immersed in a coagulating bath consisting of acetone, 6 minutes immersion in this bath being sufficient to improve the properties of the gel film. The gel film is then stripped from the supporting plate, washed free of salt and acetone by means of water, placed on a chromium plate, excess water removed with a squeegee, and then air-dried. The resulting film is strong and fairly clear.

*Example IV*

An aqueous dispersion containing 12% of the cellulose of Example III, and 15%, based on weight of cellulose, of the sodium salt of a styrene/maleic anhydride copolymer as the water-soluble, polymeric film-forming material, is formed into a cloudy, strong film by the procedure of Example III with the single exception that the solvent salt bath is an aqueous 68% lithium bromide solution maintained at 105° C.

*Example V*

An aqueous dispersion of 12% of the cellulose of Example III and 15%, based on weight of cellulose, of sodium polyacrylate as the water-soluble, polymeric film-forming material, is formed into a film by the process of Example III with the single exception that the solvent salt bath is a 57% aqueous calcium thiocyanate solution maintained at 110° C. The air-dried film is cloudy but fairly strong.

*Example VI*

An aqueous dispersion containing 10% of the cellulose of Example III and 10%, based on weight of cellulose, of sodium alginate as the water-soluble, polymeric film-forming material, is formed into a film by the procedure of Example III with the single exception that the solvent salt bath is a 57% aqueous calcium thiocyanate solution maintained at 112° C. The air-dried film obtained is fairly clear and has good strength.

*Example VII*

An aqueous dispersion containing 22% of cellophane (cellulose film regenerated from viscose) ground to pass through a 50-mesh screen and 15%, based on weight of cellulose, of polyvinyl alcohol (86.89% hydrolyzed polyvinyl acetate, viscosity of 4% water solution at 20° C. determined by Hoeppler falling ball method being 35–45 centipoises) as the water-soluble, polymeric film-forming material, is prepared by mixing until uniform and formed into a film by the method of Example III. The resulting air-dried film is cloudy.

*Example VIII*

An aqueous particulate dispersion containing 11.7% of the cellulose of Example III and 2.3% of a finely divided copolymer of acrylonitrile and butadiene in the ratio of 32 to 68, with 15% based on the total weight of cellulose and copolymer, of sodium alginate, is prepared by the method of Example III. This dispersion is formed into a film by the method of Example III with the single exception that the solvent salt bath is a 68% aqueous solution of lithium bromide maintained at 107° C. The resulting air-dried film is cloudy but has good strength. The copolymer of acrylonitrile and butadiene is at least partially coalesced in the preparation of the film.

*Example IX*

A particulate cellulose-zein dispersion is prepared by mixing until uniform 1.7 parts of finely divided zein and 15 parts of finely divided, chemically purified wood cellulose (97% passing through a 100-mesh screen) with a solution of 2.5 parts of sodium alginate in 97.5 parts of water. The resulting dispersion is spread in a uniform layer about 3 to 4 mils in thickness on a glass plate, and the coating is allowed to air dry until about one-fourth of the water is evaporated. The coated plate is then immersed in 57% aqueous calcium thiocyanate solution maintained at a temperature of 110°–120° C. for six minutes. The supported coalesced film is immersed for six minutes in a coagulating bath consisting of acetone. The gel film is stripped from the supporting plate, washed free of salt and acetone by water, excess water is removed from the film by blotting with filter paper, and the film is then air-dried. The resulting film is fairly strong and translucent.

*Example X*

A film containing approximately 90% cellulose and 10% casein, which is fairly strong and translucent, is prepared in the manner described in Example IX with the single exception that 1.7 parts of finely divided casein is substituted for the zein.

*Example XI*

Twelve parts of air-dried finely ground wood having a particle size less than 300 microns is stirred with a solution of 100 parts of concentrated nitric acid in 150 parts of water for 90 minutes at 41° C. The treated wood is washed thoroughly with water to remove the acid and is then slurried in water in a high-speed mixer. The slurry is filtered and the wood powder is dried in air. This acid-treated wood powder is soluble in 57% aqueous calcium thiocyanate solution at 120° C.

A particulate dispersion of this acid-treated, finely divided wood is prepared by mixing 2.5 parts of the air-dry wood flour with a solution of 0.375 part of sodium alginate dissolved in 15 parts of water. The resulting viscous paste is diluted with 30 parts of water and the dispersion stirred with a high-speed mixer. The resulting particulate dispersion is spread in a layer about 10 mils thick on a glass plate by means of a doctor knife. The supported film is allowed to partially air-dry and is then immersed for six minutes in 68% aqueous lithium bromide solution at 105° C. to coalesce the wood particles. The supported film is then immersed in acetone at room temperature for six minutes, after which the film is stripped from the glass plate, washed with water, and dried between filter paper at room temperature. The resulting air-dry film is cloudy and somewhat pliable.

It will be understood that the above examples are merely illustrative and that the invention broadly comprises the preparation of shaped articles by extruding through a die to form a shaped article an aqueous particulate dispersion of finely-divided cellulose-containing natural polymer having an average particle size of less than 300 microns in diameter, the dispersion including a water-soluble, polymeric film-forming material, contacting said shaped article with a salt solution capable of dissolving the natural polymer, until the finely-divided natural polymer is coalesced, removing the article from the salt solution before it loses its shape, and then washing the article free of salt.

The natural polymer may be cellulose or a mixture of natural polymers containing at least 60% of cellulose. In general, any type of unsubstituted cellulose or water-insoluble, low-substituted cellulose, i. e., cellulose derivatives having at least 2.5 free hydoxyl groups per glucose unit, having an average particle size of less than 300 microns in diameter, can be used in the process of this invention. Cellulose particles having an average diameter of less than 100 microns are preferred as being more readily and uniformly coalesced and giving better products. Cellulose of the indicated particle size can be obtained by grinding cotton linters, wood pulp, wood, regenerated cellulose films or filaments, and water-insoluble low-substituted celluloses cold in a ball mill, in a buhrstone mill, in a micropulverizer, or in an attrition mill of the type known as a micronizer.

Although the present invention requires the use of finely-divided cellulose and there is no real lower limit on the range of particle size, particles of size less than one micron in diameter ordinarily would not be available and, hence, would not be used. Thus, the particle size of the cellulose ordinarily used in this invention is relatively great compared to the particle size of synthetic polymers made by emulsion polymerization and of rubber in rubber latices, where the polymer particles are of colloidal size.

The D. P. (degree of polymerization) of the cellulose is not a critical factor in the present invention but more satisfactory results, particularly in the strength of the shaped article, are obtained when using a cellulose, substituted or unsubstituted, having a D. P. of at least 150. Preferably, a cellulose having a D. P. of 150 to 1000 is used and it has been found that the optimum D. P. range is from approximately 400 to 800.

The D. P. values given above and throughout the specification are values of the degree of polymerization calculated as follows: The absolute viscosity of a solution of cellulose in cupri-ethylenediamine is determined by Tappi suggested method T-230sm-46 (Paper Trade Journal, 124, 37-41 (1947)), the solution being prepared as described for the falling ball method, but the viscosity actually being determined in a Cannon-Fenske viscometer. From the observed absolute viscosity is calculated the intrinsic viscosity, $[\eta]$, and the degree of polymerization, D. P., is calculated from $[\eta]$ by the following formula:

$$D. P. = [\eta]^{1.105} \times 118.4$$

The use of finely-divided chemically treated cellulose is advantageous in this invention and this is the preferred type. Such cellulose includes fibers and films regenerated from viscose or cellulose acetate, and water-insoluble derivatives of cellulose with monofunctional reactants, having a degree of polymerization of at least 150, e. g., methylcellulose, ethylcellulose, cyanoethylcellulose, cellulose acetate, and the like, having at least 2.5 free hydroxyl groups per glucose unit. Commercial wood pulps, commonly known as dissolving pulps, having a D. P. of about 300 to 1000 are well adapted for use in the process of this invention. Also, cotton linters or wood pulps which have been activated by contact with a solution of a strong acid, preferably a mineral acid, e. g., aqueous nitric, hydrochloric, or sulfuric acid, are very useful. Thus, acid-treated celluloses of the previously specified particle size having a D. P. of 300 to 1000 are especially preferred. A useful form of treated cellulose is that obtained by contacting cotton linters or wood pulp with a dilute solution of sulfuric acid in glacial acetic acid, the quantity of sulfuric acid in the solution amounting to approximately 1.5% by weight of the cellulose. The resultant active cellulose, which contains about 5% acetyl, can be used directly after washing free of acid, or it may be reacted with an alcoholic solution of an alkali such as potassium hydroxide to remove the acetate groups.

As illustrated in Examples IX and X, other water-insoluble finely divided natural polymers can be incorporated in the dispersion along with the finely divided cellulose particles. Natural polymers that can be used in this way include finely divided zein, casein, silk fibroin, wool and hair. The particulate cellulose-containing dispersions adapted for use in the instant process can also include various water-insoluble modifiers, if desired, such as plasticizers, pigments, inert fillers, or water-insoluble synthetic polymers and copolymers, as illustrated in Example VIII, provided that finely divided cellulose comprises at least 60% of the dispersed material. When the dispersion includes finely-divided water-insoluble synthetic polymers or copolymers, these may be coalesced along with the cellulose particles, partly coalesced, or left essentially in the form of discrete particles, depending on the effect of the particular solvent salt solution used or on the particular polymer or copolymer selected. In Example VIII, the copolymer used coalesced to an appreciable extent. Other finely-divided synthetic polymers that can be incorporated in the cellulose dispersions include N-alkoxymethyl polyamides, polystyrene, alkyd resins, and urea-formaldehyde resins. These synthetic polymers are preferably employed in the form of emulsions.

The operability of the instant process as contrasted to that disclosed in the aforementioned U. S. application Serial No. 283,356, now Patent No. 2,737,459, of Bechtold and Werntz, is in no way dependent on the presence of a solvent salt such as calcium thiocyanate in the particulate cellulose dispersion. The presence of a solvent salt in the dispersion is not excluded so long as the dispersion retains its character of being a particulate cellulose dispersion.

The water-soluble, polymeric film-forming material is an essential component of the cellulose dispersions used herein. Any water-soluble, polymeric film-forming material can be used, including those of the nonionic and ionic (both the anionic and cationic) types. The polymeric film-forming material provides a binding action on the cellulose particles in the shaped dispersion and this facilitates its handling prior to coalescence of the cellulose particles. The water-soluble, polymeric film-forming material can be used over a wide range of concentration in the cellulose dispersions, concentrations of 5% to 20%, by weight of the cellulose, being satisfactory. Concentrations of 10% to 15% are preferred as they generally give shaped articles of the best properties.

In addition to the water-soluble, polymeric film-forming materials mentioned in the examples, other well suited polymers of this type include the polyethylene oxide known commercially as "Carbowax" 4000, the water-soluble methylcellulose known commercially as "Methocel" 4000, corn starch, the polymeric quaternary ammonium salt poly(methacrylyloxyethyltrimethylammonium methylsulfate), the sodium salt of carboxymethylcellulose, and the carbonate of a vinyl acetate/allyl glycidyl ether (95/5) copolymer, Guar gum, pectin, polyacrylamide, dextran, sodium cellulose sulfate, sodium sulfoethylcellulose, and sodium polymethacrylate.

The solvent salt solutions useful in coalescing the shaped particulate cellulose dispersion in the process of this invention can be any of the concentrated salt solutions that are known to dissolve cellulose at elevated temperatures, e. g., 90° C. to 150° C. Concentrated aqueous solutions of neutral salts that form hydrates and have boiling points within a certain range, that have viscosities above a certain minimum, and have positive heats of dilution within certain limits, as defined by Williams in Manchester Memoirs, vol. LXV, No. 12, 1-14 (1921), are especially suitable and are preferred for use in this invention. If desired, the coalescing solutions can be composed of a mixture of such neutral salts or a mixture of a solvent salt with a nonsolvent salt in such proportions that the mixed solution meets the above-mentioned limiting properties.

Examples of such aqueous salt solutions that are suitable as coalescing baths in the process of this invention include concentrated aqueous solutions of calcium thiocyanate, lithium thiocyanate, sodium thiocyanate, zinc thiocyanate, lithium bromide, zinc bromide, calcium bromide, zinc chloride, calcium nitrate, cadmium iodide, and mixtures of such salts. Specific examples of such aqueous solvent salt solutions well adapted for use in the instant process are: 70% calcium nitrate, 57% calcium thiocyanate, 68% lithium bromide, and 50% zinc thiocyanate. In general, best results are obtained with salts of metals of groups I and II of the periodic table with inorganic acids, when used in concentrations ranging from about 50% to 82%, depending upon the particular salt. Specific examples of aqueous solutions of mixtures of solvent and nonsolvent salts which are useful coalescing baths include aqueous solutions containing 28% calcium thiocyanate and 28% calcium chloride, and 20% calcium thiocyanate and 40% calcium chloride.

In addition to aqueous solutions of these neutral salts, concentrated solutions of such salts in organic solvents such as methanol and ethylene glycol are also useful as solvent salt baths for coalescing the cellulose particles in the process of this invention. Specific examples are: methanol solutions containing 70% calcium nitrate tetrahydrate, 60% sodium thiocyanate, and 75% ammonium thiocyanate; and ethylene glycol solutions containing 65% cadmium iodide and 60% zinc bromide. In addition, aqueous solutions of combinations of inorganic salts with certain organic compounds also form useful solvent salt solutions. For example, aqueous solutions containing 65% sodium thiocyanate and 12% dicyandiamide, and 60% calcium chloride and 6% sucrose, are operable in this process.

Best results are obtained with one of the following solutions, containing the salt or mixture of salts in the approximate concentration indicated:

Aqueous solutions containing 57% calcium thiocyanate, 75% calcium bromide, 80% zinc chloride, 82% zinc bromide, 60% lithium thiocyanate, or a mixture of 28% calcium thiocyanate with 28% calcium bromide, and methanol solutions containing 70% lithium bromide or 75% calcium bromide. These are especially preferred for use in the present invention since they produce films of the best clarity. Of these preferred salt solutions, 70% lithium bromide in methanol gives films of the greatest strength. Other concentrations of these salts will also give good results, e. g., although the indicated concentration of approximately 57% calcium thiocyanate is preferred, the aqueous solution can contain from 51% to 75% of calcium thiocyanate.

Various types of coagulating baths can be used to improve the properties of the gel structures. Examples of suitable coagulating baths include aqueous salt solutions such as, for example, 25% sodium chloride, 25% calcium chloride, 35% magnesium chloride, 50% sodium formate, 30% sodium acetate, 25% ammonium chloride, 50% ammonium nitrate, 30% lithium bromide, and other baths such as 50% aqueous glycerol, 50% aqueous acetic acid, absolute alcohol, 2B denatured alcohol, glycerol, methanol, and acetone. One of the preferred coagulating baths is 25% aqueous sodium chloride since it forms films of greater clarity and strength than many of the others. If calcium thiocyanate solution is employed as the coalescing bath, sodium chloride is especially preferred as a coagulating bath since calcium thiocyanate can be recovered easily from solutions containing these two salts. Acetone is another preferred coagulating bath since it also gives fibers and filaments of greater clarity and strength than many of the others.

The cellulose gel films or filaments, prior to the final drying step, can be impregnated with softeners, plasticizers, polymers, or dyes by immersing the gel film or filament in an aqueous solution of the desired softener or other modifier.

The present invention avoids serious difficulties which are inherent with the previously known methods of preparing shaped articles from cellulose compositions of various types. One of the disadvantages of one of the prior art methods is that the high temperatures or prolonged periods used for dissolving the cellulose in concentrated salt solutions caused considerable degradation of the cellulose. Consequently, the molecular weight or degree of polymerization of the cellulose in the final shaped article was too low to provide articles of acceptable strength. The process of the aforementioned application Serial No. 283,356, now Patent No. 2,737,459, of Bechtold and Werntz does not possess such disadvantages since it reduces the time of exposure of cellulose to hot salt solutions. However, the process of the present invention provides a further reduction in the time of exposure of cellulose to hot solvent salt solutions. It also avoids working with highly viscous gums which are difficult to handle. Furthermore, the use of pressure in the coalescence of the shaped article is not essential.

In addition to their use in the formation of shaped articles such as films and filaments, the cellulose dispersions can be converted by the process of this invention to sponges or coatings applied on various substrates as a finish, or coated on fabrics.

As many apparently widely different embodiments of this invention may be made without departing from the spirit and scope thereof, it is to be understood that the invention is not limited to the specific embodiments thereof except as defined in the appended claims.

The invention claimed is:

1. The process which comprises the steps of extruding through a die to form a shaped article an aqueous particulate dispersion of finely-divided natural polymer comprising at least 60% of cellulose and having an average particle size of less than 300 microns in diameter, said dispersion containing a water-soluble, polymeric film-forming material, coalescing said cellulose particles by contacting said shaped article with a solvent salt solution capable of dissolving said natural polymer, removing said article from said salt solution after the cellulose particles are substantially coalesced and before said article loses its shape, and washing said article free of said salt.

2. A process as defined in claim 1 which includes the step of treating said article with a coagulating bath after said coalescing step and prior to said washing step.

3. A process as defined in claim 2 which includes the step of treating said article with a setting bath after said extruding step and prior to said coalescing step.

4. A process as defined in claim 1 which includes the steps of passing said article through heated calendering rolls and treating said article with a coagulating bath after said coalescing step and prior to said washing step.

5. A process as defined in claim 1 wherein said aqueous particulate dispersion of finely-divided natural polymer comprises 1 to 7 parts, by weight, of finely-divided cellulose having an average particle size of less than 300 microns in diameter, dispersed in 19 to 13 parts, by weight, of water containing 5% to 20%, by weight of said cellulose, of a water-soluble polymeric film-forming material dissolved therein.

6. A process as defined in claim 1 wherein said aqueous particulate dispersion of finely-divided natural polymer comprises 1 to 2.5 parts, by weight, of finely-divided cellulose having an average particle size of less than 100 microns in diameter and a degree of polymerization of 150 to 1000, dispersed in 9 to 7.5 parts, by weight, of water containing 10% to 15%, by weight of said cellulose, of a water-soluble, polymeric film-forming material dissolved therein.

7. A process as defined in claim 5 wherein said finely-divided cellulose has been acid-treated and has a degree of polymerization of 300 to 1000.

8. A process as defined in claim 1 wherein said natural polymer is a mixture of cellulose and other natural polymer.

9. The process which comprises the steps of extruding through a die to form a shaped article, an aqueous particulate dispersion of finely-divided cellulose having an average particle size of less than 300 microns in diameter, said dispersion containing a water-soluble, polymeric film-forming material, coalescing said cellulose particles by contacting said shaped article with a solvent salt solution capable of dissolving said cellulose, removing said article from said salt solution after the cellulose particles are substantially coalesced and before said article loses its shape, and washing said article free of said salt.

10. The process which comprises the step of extruding through a die to form a shaped article an aqueous particulate dispersion of finely-divided cellulose having an average particle size of less than 100 microns in diameter and a degree of polymerization of 150 to 1000, said aqueous dispersion containing 5% to 20%, by weight of said cellulose, of a water-soluble, polymeric film-forming material, coalescing said cellulose particles by contacting said shaped article with a solvent salt solution capable of dissolving said cellulose, at a temperature of 90° C. to 150° C., removing said article from said salt solution after the cellulose particles are substantially coalesced and before said article loses its shape, and washing said article free of said salt.

11. A process as defined in claim 10 wherein said salt solution is an aqueous calcium thiocyanate solution.

12. A process as defined in claim 10 wherein said salt solution is a lithium bromide solution.

13. A process as defined in claim 10 wherein said film-forming material is sodium alginate.

14. A process as defined in claim 10 wherein said film-forming material is polyvinyl alcohol.

References Cited in the file of this patent

UNITED STATES PATENTS

| | | |
|---|---|---|
| 113,454 | Schmidt | Apr. 4, 1871 |
| 341,072 | Stanford | May 4, 1886 |